United States Patent
Heskett et al.

[15] 3,675,777
[45] July 11, 1972

[54] FLUID TREATING CARTRIDGE WITH INTEGRAL SEAL

[72] Inventors: Don E. Heskett, Villa Park; Frank Kryder Hoover, Evanston, both of Ill.; Robert Burkhalter, Jr., Fort Atkinson, Wis.

[73] Assignee: Morten-Norwich Products, Inc., Chicago, Ill.

[22] Filed: Nov. 24, 1969

[21] Appl. No.: 879,259

[52] U.S. Cl. .......................................... 210/232, 210/497
[51] Int. Cl. ..................................................... B01d 27/00
[58] Field of Search ................. 210/232, 282, 497; 285/110, 285/230, 231; 277/DIG. 2

[56] References Cited

UNITED STATES PATENTS

| | | | |
|---|---|---|---|
| 2,980,449 | 4/1961 | Dunton | 277/207 A X |
| 3,186,552 | 6/1965 | Cutler | 210/497 X |
| 3,315,971 | 4/1967 | Sakurada | 285/231 X |
| 3,520,541 | 7/1970 | Rohani | 277/207 A X |
| 3,368,830 | 2/1968 | French | 277/207 A |

FOREIGN PATENTS OR APPLICATIONS

| | | | |
|---|---|---|---|
| 1,465,727 | 12/1965 | France | 285/110 |

*Primary Examiner*—Reuben Friedman
*Assistant Examiner*—Frederick F. Calvetti
*Attorney*—Pendleton, Neuman & Anderson

[57] ABSTRACT

This disclosure relates to a fluid treating cartridge adapted to be employed with fluid treating apparatus, in which a fluid-tight seal is required between the fluid treating element and a tube which projects coaxially into a central bore within the element. The seal is molded integrally with an end cap of the cartridge and tightly encircles the tube with a force which is proportional to the pressure differential across the seal.

8 Claims, 3 Drawing Figures

INVENTORS
Don Edward Heskett
Frank Kryder Hoover
Robert Burkhalter, Jr.
by Pendleton, Neuman, Seibold
and Williams Attys

3,675,777

FLUID TREATING CARTRIDGE WITH INTEGRAL SEAL

BACKGROUND OF THE INVENTION

The present invention relates to fluid-tight seals and particularly to such seals as may b used in conjunction with a replaceable fluid treating cartridge, employed in apparatus for filtering water or other fluids.

Many fluid-tight seals have already been devised to effect sealing between two bodies after they have been assembled together. A primary limitation of such seals has been, however, the need for relatively great forces exerted between the parts to be sealed, in order to attain a fluid-tight seal across a considerable pressure differential. This gives rise to considerable frictional forces resisting disassembly of the parts for replacement of the removable cartridge. It is desirable to provide such a seal, which does not produce significant frictional force resisting disassembly of the cartridge. It is also desirable to form the seal integrally with the cartridge, so that as few as possible separate parts are necessary to form the seal.

SUMMARY OF THE INVENTION

Accordingly, it is a principal object of the present invention to provide sealing means which are capable of forming a fluid-tight seal across relatively large pressure differentials, but which may be easily assembled and disassembled.

Another object of the present invention is to provide such a seal, formed as a part of a fluid treating cartridge.

These and other objects and advantages of the present invention will become manifest upon an examination of the following description and the accompanying drawings.

In one embodiment of the present invention there is provided a fluid treating cartridge having an end cap with an integrally connected tube extending inwardly along an interior bore of a treating element, the inward extremity of said tube having a deformable conical shaped member projecting back toward the outer end of the tube.

DESCRIPTION

Reference will now be made to the accompanying drawings in which.

Figure 1:
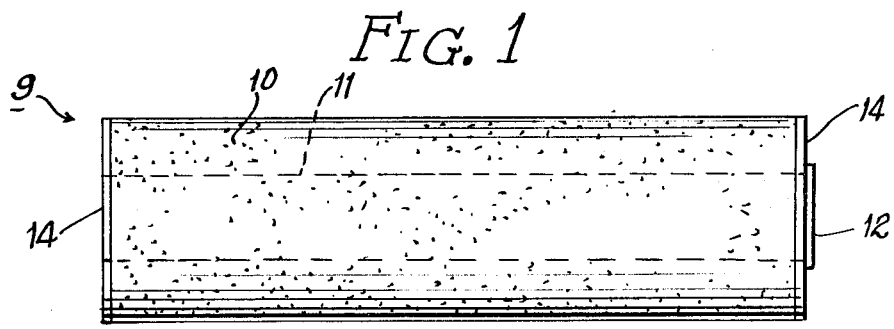
FIG. 1 is a side elevation of a replaceable treating cartridge incorporating an illustrative embodiment of the present invention.
Figure 2:
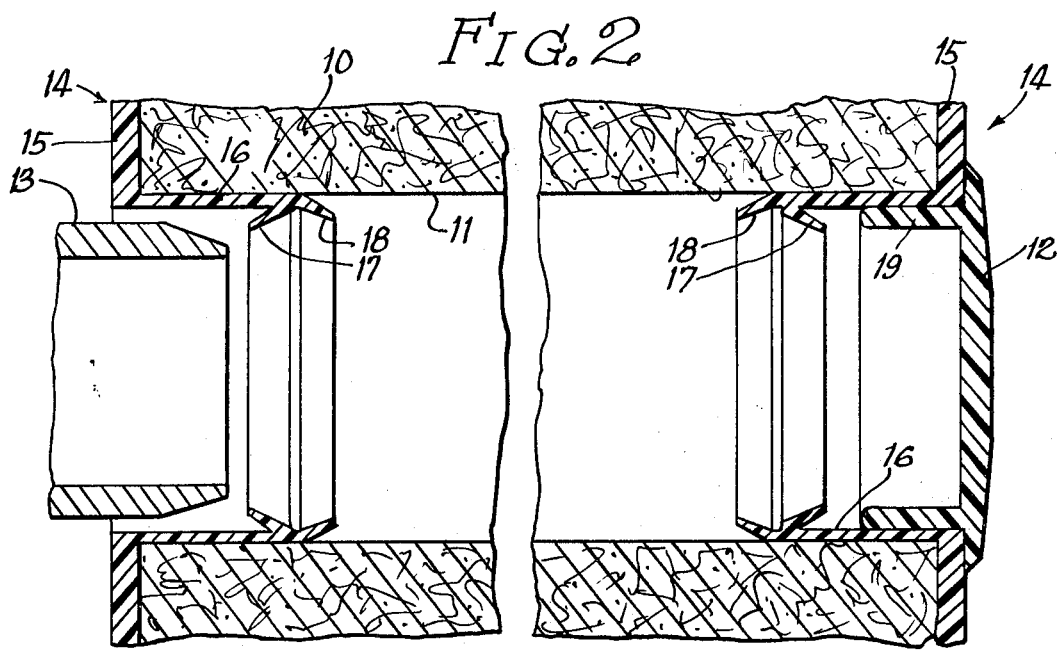
FIG. 2 is a vertical cross sectional view of the element of FIG. 1, shown in disassembled relation with a tube to which it is to be connected.
Figure 3:
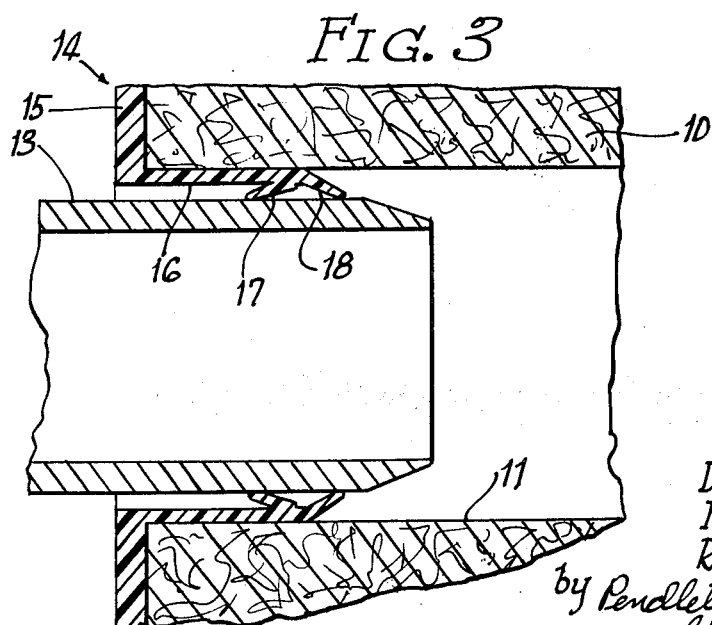
FIG. 3 is a view similar to FIG. 2, showing the treating element in assembled relation with the tube.

Referring now to FIG. 1, there is shown a side elevation of a replaceable fluid treating cartridge 9 such as may be employed with water filtering and treating apparatus or the like, and including a treating element 10. The treating element 10 is designed to treat fluids by having the same pass inwardly through the cylindrical side of the element to a central bore 11. From the central bore 11 the fluid flows on toward the place where it is used. One end of the treating element 10 is sealed, by means of a closure cap 12, so that the only exit for treated fluid is through the other end of the element, which is designed to be connected to a tube 13 (FIGS. 2 and 3), which collects the treated fluid and conducts the same on toward where it is used. As shown in FIGS. 2 and 3, the tube 13 has its end disposed within the left hand end of the element 10. The end of the tube 13 is beveled.

An end cap 14, formed of resilient, fluid impermeable material, such as polyethylene or polyvinylacetate or the like, is disposed on each end of the treating element 10. Each end cap 14 comprises an exterior flange 15 flush with the end of the cylindrical treating element, and an inwardly projecting tube 16, which is received in the central bore 11 of the treating element 10. Near the inward extremity of the tube 16 is provided a section 17 which projects back toward the exterior end of the tube 16. The section 17 is formed generally in the shape of a hollow truncated cone, and its thickness tapers off toward its edge. A conical-shaped section 18 is formed on the inner extremity of the tube 16, extending inwardly away from the tube, to aid in inserting the tube 16 into the bore 11 during assembly of the end cap 14 with the element 10. When the treating element 10 is in unassembled relation with the pipe 13, as shown in FIG. 2, the section 17 projects radially inwardly slightly beyond the outside diameter of the pipe 13. The section 17 is preferably integrally formed with the tube 16, but alternatively may be adhesively secured thereto. When the pipe 13 is moved inwardly into assembled relation with the treating element 10, as shown in FIG. 3, the beveled end of the pipe 13 easily passes through the central aperture within the section 17, and the section 17 is deformed outwardly so as to lie partially flat against the exterior circular cylindrical surface of the pipe 13, and to form a fluid-tight seal therewith.

As the fluid pressure is higher on he outside of the treating element 10 than it is within the central bore 11, any leakage which may occur travels rightwardly as illustrated in FIGS. 2 and 3. The pressure differential across the seal in this direction urges the section 17 into close sealing association with the outside surface of the pipe 13. Accordingly, the sealing force is generally proportional to the pressure differential across the seal. The pressure across the seal is relieved prior to removing the cartridge 9. The use of the seal of the present invention on a treating element cartridge greatly facilitates removal and replacement of the cartridge, because of the slight force resisting removal of the cartridge.

As the end of the conical section 18 also engages the outer surface of the pipe 13, it helps to insure a seal with the pipe 13 whenever the pressure drop across the treating element 10 is in the reverse direction to that described above, as it is when the treating element 10 is backwashed, for example.

The end cap 14, provided at the closed end of the treating element 10, is provided with a section 17 identical with that at the other end of the element 10, but this sealing member is not functional at the right hand end of the treating element 10, for a seal with the central bore 11 is not needed there. The central bore 11 is closed at this end by the closure cap 12, which has an inwardly extending tube 19 extending inwardly into the end cap 14 to form a fluid-tight seal against the tube 16, and the flange 15 of the end cap 14.

The treating element 10 employed in the present invention operates to treat fluid flowing through it by separating out matter in suspension in the fluid, and by separating out unwanted constituents of the fluid. The treating element is, in one embodiment, formed of a polymeric matrix having a plurality of cavities disposed generally uniformly throughout, the cavities containing filtering and treating material, as described and claimed in the application of Donald E. Heskett et al., Ser. No. 581,507, filed Sept. 23, 1966. By selection of the proper treating material, taste, color and odor can be removed from the fluid by absorption or adsorption; the fluid can be softened by ion exchange; the fluid can be neutralized by removing hydrogen or hydroxyl ions; and chlorine or hypochlorous acid can be removed from the fluid.

What is claimed is:

1. A fluid treating cartridge comprising a body of treating material, said body having a central cylindrical passageway opening at one end of said body and a cylindrical tube in a fixed relation to said cartridge disposed within the open end of said passageway, said tube having a resilient, first and second fluid impermeable sealing members secured to the interior thereof and adapted to form a seal between said tube and a conduit extending into said tube, said seal constructed and arranged to resist leakage of fluid from outside said body thereinto and vice versa, said first sealing member comprising a deformable hollow conical member projecting radially inwardly from said tube and axially toward one end of said passageway, said second sealing member projecting radially inwardly from said tube and axially toward the opposite end, said tube and said conical member formed as a single piece construction, said conical member cooperating with a tapered surface of said conduit to deform outwardly as said conduit is inserted into assembled relation with said cartridge.

2. Apparatus according to claim 1, including a flange connected to the exterior end of said tube and juxtaposed with said one end of said body.

3. Apparatus according to claim 1, wherein said tube and sealing member are formed of thermoplastic material.

4. Apparatus according to claim 1, were said sealing member is shaped in the form of a hollow cone, the thickness of said sealing member tapering from a greater thickness adjacent said tube to a lesser thickness at a location remote from said tube.

5. Apparatus according to claim 1, wherein said passageway extends through said body, and including means at the end of said body opposite said one end for closing said passageway.

6. Apparatus according to claim 5, including a second tube disposed within said opposite end, and a closure cap having a flange juxtaposed with the end of said second tube.

7. Apparatus according to claim 1, wherein said conduit has an outside diameter slightly larger than the inner diameter of said hollow conical member, the end of said conduit being beveled to reduce the outer diameter of the end of said conduit to less than that of said inner diameter.

8. Apparatus according to claim 1, wherein said body is a right circular cylinder, and said central passageway is circular.

* * * * *

UNITED STATES PATENT OFFICE
CERTIFICATE OF CORRECTION

Patent No. 3,675,777                    Dated July 11, 1972

Inventor(s) Don E. Heskett and Frank Kryder Hoover

It is certified that error appears in the above-identified patent and that said Letters Patent are hereby corrected as shown below:

In the first column on the page of the patent following the drawings, after "Assignee", "Morten-Norwich Products, Inc." should be -- Morton-Norwich Products, Inc. --

Column 1, line 5, "b" should be -- be -- line 17, before "significant" insert -- a --

Column 2, line 16, "he" should be -- the --

Column 3, line 6, "were" should be -- where --

Signed and sealed this 27th day of February 1973.

(SEAL)
Attest:

EDWARD M. FLETCHER, JR.                 ROBERT GOTTSCHALK
Attesting Officer                       Commissioner of Patents